US008463692B2

(12) United States Patent
de Boer et al.

(10) Patent No.: US 8,463,692 B2
(45) Date of Patent: *Jun. 11, 2013

(54) METHOD AND SYSTEM TO FACILITATE ON-LINE TRADING

(75) Inventors: Michiel de Boer, San Francisco, CA (US); Yung Ho Kang, Cupertino, CA (US); Michael Paul Raneri, San Francisco, CA (US)

(73) Assignee: TradeKing Group, Inc., Fort Lauderdale, FL (US)

( * ) Notice: Subject to any disclaimer, the term of this patent is extended or adjusted under 35 U.S.C. 154(b) by 605 days.

This patent is subject to a terminal disclaimer.

(21) Appl. No.: 12/491,762

(22) Filed: Jun. 25, 2009

(65) Prior Publication Data

US 2010/0332366 A1 Dec. 30, 2010

(51) Int. Cl.
*G06Q 40/00* (2012.01)
(52) U.S. Cl.
USPC ............... 705/37; 705/35; 705/36; 705/38; 705/26.1; 705/67; 707/706; 709/236; 380/279
(58) Field of Classification Search
USPC ........ 705/35, 38, 26.1, 67; 715/234; 707/706; 709/236; 380/279
See application file for complete search history.

(56) References Cited

U.S. PATENT DOCUMENTS

| | | | |
|---|---|---|---|
| 5,819,271 A | 10/1998 | Mahoney et al. | |
| 6,282,548 B1 | 8/2001 | Burner et al. | |
| 6,515,681 B1 | 2/2003 | Knight | |
| 6,563,514 B1 | 5/2003 | Samar | |
| 6,636,856 B2 | 10/2003 | Pasquali | |
| 6,859,212 B2 | 2/2005 | Kumar et al. | |
| 7,065,483 B2 | 6/2006 | Decary et al. | |
| 7,146,335 B2 | 12/2006 | Rose | |
| 7,165,044 B1 * | 1/2007 | Chaffee | 705/37 |
| 7,242,669 B2 * | 7/2007 | Bundy et al. | 370/252 |

(Continued)

FOREIGN PATENT DOCUMENTS

WO  WO-2010151383 A1  12/2010

OTHER PUBLICATIONS

While InNexus Biotech Corp. Announce Re-Showing of Interview, Others Announce Director Feature, File Petition, Announce CEO Presentation, Quarter Results, and Approve Stock Split; M2 Presswire , NA; Mar. 5 , 2007.*

(Continued)

*Primary Examiner* — Tien Nguyen

(74) *Attorney, Agent, or Firm* — Schwegman Lundberg & Woessner, P.A.

(57) ABSTRACT

A method and system to facilitate on-line trading is presented. An example system, in one embodiment, comprises a web page scanner, a trading control generator, an event detector, and a trading ticket generator. The web page scanner may be configured to scan a web page in order to detect security symbol information. The trading control generator may be configured to present a trading control to associate visually the trading control with the detected security symbol information, the trading control to access a trading service. The event detector may be configured to detect an event associated with the trading control, so that the trading ticket generator receives a request to launch a trading ticket associated with the security symbol information. A trading ticket may be then utilized by a user for submitting a security order using the trading service.

19 Claims, 9 Drawing Sheets

U.S. PATENT DOCUMENTS

| | | | |
|---|---|---|---|
| 8,027,893 B1* | 9/2011 | Burrows et al. | 705/35 |
| 2001/0049651 A1 | 12/2001 | Selleck | |
| 2002/0019810 A1* | 2/2002 | Kumar et al. | 705/42 |
| 2002/0023040 A1* | 2/2002 | Gilman et al. | 705/37 |
| 2002/0049666 A1* | 4/2002 | Reuter et al. | 705/37 |
| 2002/0077930 A1 | 6/2002 | Trubey et al. | |
| 2002/0095651 A1 | 7/2002 | Kumar et al. | |
| 2004/0193524 A1* | 9/2004 | Almeida et al. | 705/36 |
| 2004/0236668 A1* | 11/2004 | Toffey | 705/37 |
| 2004/0254881 A1 | 12/2004 | Kumar et al. | |
| 2005/0038707 A1* | 2/2005 | Roever et al. | 705/21 |
| 2005/0154662 A1 | 7/2005 | Langenwalter | |
| 2005/0261836 A1* | 11/2005 | Meng et al. | 702/19 |
| 2006/0069635 A1* | 3/2006 | Ram et al. | 705/37 |
| 2006/0168509 A1 | 7/2006 | Boss et al. | |
| 2006/0230011 A1 | 10/2006 | Tuttle et al. | |
| 2007/0027672 A1 | 2/2007 | Decary et al. | |
| 2007/0208751 A1 | 9/2007 | Cowan et al. | |
| 2007/0265954 A1 | 11/2007 | Mather et al. | |
| 2007/0276841 A1 | 11/2007 | Rhoads et al. | |
| 2008/0040681 A1 | 2/2008 | Synstelien et al. | |
| 2008/0065737 A1 | 3/2008 | Burke et al. | |
| 2008/0114709 A1 | 5/2008 | Dixon et al. | |
| 2008/0172598 A1 | 7/2008 | Jacobsen et al. | |
| 2008/0195954 A1 | 8/2008 | Dharmarajan et al. | |
| 2008/0205655 A1 | 8/2008 | Wilkins et al. | |
| 2010/0332340 A1 | 12/2010 | de Boer et al. | |

OTHER PUBLICATIONS

New GRC Solutions from SAP Help Mitigate Trade Risk Across Global Supply Chain; PR Newswire, p. NA; Mar. 18, 2009.*

"Equity Pilot—Research Assistant", [Online]. Retrieved from the Internet: <URL: https://addons.mozilla.org/en-US/firefox/addon/9475/>, (May 19, 2010), 5 pgs.

"GetGlue", [Online]. Retrieved from the Internet: <URL: http://getglue.com/>, (May 19, 2010), 2 pgs.

"Glue—Recommendations for Books/Movies/Music 4.5.21", [Online]. Retrieved from the Internet: <URL: https://addons.mozilla.org/en-US/firefox/addon/3481/>, (May 19, 2010), 5 pgs.

"International Application No. PCT/US2010/034859, Search Report mailed Jul. 13, 2010", 2 Pgs.

"International Application No. PCT/US2010/034859, Written Opinion mailed Jul. 13, 2010", 7 Pgs.

"U.S. Appl. No. 12/779,255, Non Final Office Action Mailed Jan. 24, 2012", 16 pgs.

"International Application No. PCT/US2010/034859, International Preliminary Report on Patentability Mailed Jan. 12, 2012", 9 pgs.

"U.S. Appl. No. 12/779,255, Preliminary Amendment filed Nov. 30, 2010", 8 pgs.

"U.S. Appl. No. 12/779,255, Response to Non Final Office Action mailed Jan. 24, 2012", 16 pgs.

* cited by examiner

METHOD AND SYSTEM TO FACILITATE ON-LINE TRADING

TECHNICAL FIELD

This application relates to the field of computer software and hardware, specifically to a computer-implemented method and system to facilitate on-line trading.

BACKGROUND

The Internet has made it possible for computer users all over the world to interact and communicate electronically. Such electronic communication supports trading in currencies, stocks, commodities and some of the newer forms of securities such as derivatives and the like, as opposed to the traditional trading "floor," in which traders would need to be physically present in order to place buy and sell orders.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
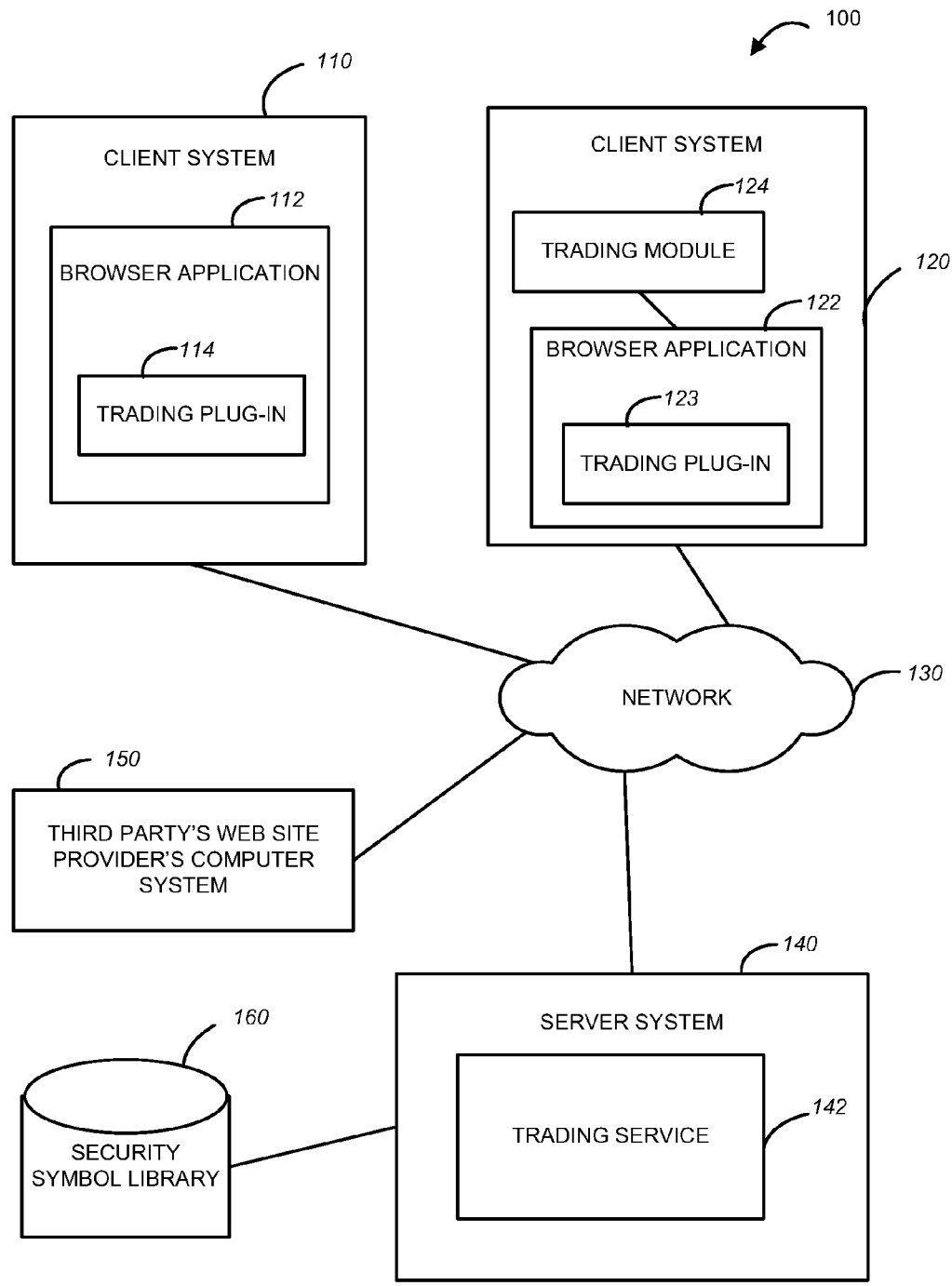
FIG. 1 is a diagrammatic representation of a network environment within which an example method and system to facilitate on-line trading using a certain trading platform may be implemented.

Internet traders generally use a wide variety of online sources for their investing research. At the same time, the timing of execution is an important aspect of a trader's success. When traders find actionable content (e.g., information related to securities) on a website it takes a couple of steps, and hence time, to act upon this information. For the purposes of this description, a security is a financial instrument that can be publicly traded on an (electronic) exchange. Securities include, but are not limited to common stocks, derivative (finance), currencies, commodities, and certain over-the-counter (OTC) products.

An example method and system to facilitate on-line trading may allow for a near-instantaneous response whenever a trader detects a piece of information on any website, and wishes (or at least considers) to immediately act upon that information.

A computer-implemented system and method to facilitate on-line trading may be provided to permit users to access a trading center (e.g., an on-line trading service hosted by a server system of a provider that may be referred to as a trading server) in a semi-automated manner, from any website that contains potentially actionable content that can be resolved into a known security symbol. For the purposes of this description, potentially actionable content that can be resolved into a known security symbol may be referred to as security symbol information. Security symbol information may include, e.g., stock symbols or the corresponding names of publicly traded companies, information associated with commodities, information associated with currencies, etc. In one example embodiment, permitting users to access a trading center from any website that contains potentially actionable content may be achieved by utilizing a client-side module, such as, for example, a desk top application, a widget, a browser plug-in or a tool bar, that is in communication with a trading server and is configured to scan the web page presented by the browser for any text containing a known security symbol or any other media (e.g., video, audio, image) or code (e.g., format, tag, bookmark, cookie) that can be resolved into a known security symbol. In one embodiment, the scanning of a web page may be performed only with respect to those web pages that were identified by the client-side trading module as associated with a financial or investing website. In other embodiments, all web pages loaded by the browser may be scanned for information indicative of a security symbol, such as the actual security symbols or the names of companies.

The information indicative of a security symbol may be determined as a result of the scanning of a web page using a configuration file that contains semantic patterns associated with websites, web pages and Internet locations. The client-side trading module may then display a recognizable visual control (e.g., a brightly-colored "Z") next to the security symbol or next to the name of a company that has an associated security symbol. The visual control, termed a "trading control," may be invoked or triggered, e.g., by clicking on the trading control or by merely hovering over the trading control. The triggering of the trading control, in one embodiment, may cause the client-side trading module to activate a secure trading ticket that may be pre-filled with information associated with the security symbol or information associated with the user's trading account.

The trading ticket may be presented as a draggable overlay on the web page, so it may not require the user to open a new browser window. As mentioned above, the trading ticket may be pre-filled with the resolved security symbol, relevant (financial) data associated with the security symbol (such as, e.g., the last trade, bid, ask, volume, analyst ratings, community data), and may also indicate relevant trading account information (e.g., buying power) in order to aid the user to make a fast and easy trading decision. The trading ticket may require minimum additional information to be entered by the user (e.g., buy/sell, market/limit) to complete the order for submission. Various options to pull and display additional relevant information from the trading server may also be provided via the client-side module. The orders submitted utilizing the trading ticked described above may be handled in the same way as any trading orders submitted directly from the trading service provider's website. An example method and system to facilitate on-line trading may be implemented in the context of a network environment 100 illustrated in FIG. 1.

As shown in FIG. 1, the network environment 100 may include client systems 110 and 120 and a server system 140. The server system 140, in one example embodiment, may host a trading service module 142 providing an on-line trading service. The client systems 110 and 120 may run respective browser applications 112 and 122 and may also host respective client-side trading modules. A client side trading module, in one example embodiment, may be provided to facilitate access to the trading service provided by the trading service module 142 from web pages that are not associated with the provider of the trading service (e.g., a web page associated with a financial website provider's computer system 150).

A client-side trading module may be implemented, e.g., as a browser plug-in (e.g., a trading plug-in 114 at the client system 110), a browser toolbar (not shown), a desk top module (e.g., a trading module 124 at the client system 120), etc. The trading module 124 may be configured to communicate with the trading service module 142 hosted by the server system 140 via a communication plug-in 123 provided with the browser application 122. A client-side trading module may have access to the trading service module 142 hosted by the server system 140 via a communications network 130. The communications network 130 may be a public network (e.g., the Internet, a wireless network, etc.) or a private network (e.g., a local area network (LAN), a wide area network (WAN), Intranet, etc.). The trading service module 142 may use a security symbol library 160, as well as a financial sites library (not shown) in order to accommodate requests from client-side trading modules.

In one example embodiment, the trading plug-in 114 (or the communication plug-in 123 associated with the trading module 124) comprises a JavaScript code and a configuration file. "JavaScript™" is a trademark of Sun Microsystems. The JavaScript code, in one embodiment, comprises a plurality of modules configured to perform various functions, as described further below. The configuration file may serve to recognize relevant websites (including domains and/or sub domains) that may present financial information. The configuration file may also direct the trading plug-in 114 to include certain pages available on a financial web site but exclude some pages (e.g., personal finance pages of users). The configuration file may also include information associated with respective locations of web pages that are likely to include a security symbol or related information such as company name. In one embodiment, in order to determine respective locations of web pages that are likely to include a security symbol or related information, the configuration file may be adapted to recognize HTML tags (e.g., <h1>), specific text (e.g., "Last trade:"), contextual information such as a URL string (e.g., http://finance.yahoo.com/q?s=AAPL), etc. In one embodiment, the scanning of a web page and recognizing of security symbol information can be based on any information that is present in media (e.g., video, audio, image) or code (e.g., format, tag, bookmark, cookie) that is involved in the web browsing session.

For each combination of website/page/location recognized by the configuration file, the JavaScript code performs a scan for security symbols (or related information like company names). In one embodiment, when it is determined that a certain web page is associated with a financial web site and is not subject to exclusion according to the settings of the configuration file, the scanning of the web page may be either generic or tailored specifically to that web page.

In one example embodiment, the configuration file determines whether a certain web page should be subject to the scanning process. When the scanning of the web page suggested by the configuration file is performed, any determined securities symbols may be verified against the symbol library 160. For each security symbol (or related information like company name) identified by the JavaScript code, a visual control is added to the web page.

A configuration file provided with the trading plug-in 114 may be periodically updated or replaced with the latest version available at the trading server 140. For example, when the browser application 112 is launched and the plug-in 114 is activated, the plug-in 114 connects to the server system 140 and obtains the latest version of the configuration file. Alternatively, the configuration file may be updated automatically, according to a predetermined update schedule. An example client-side trading module may be described with reference to FIG. 2.

Figure 2:
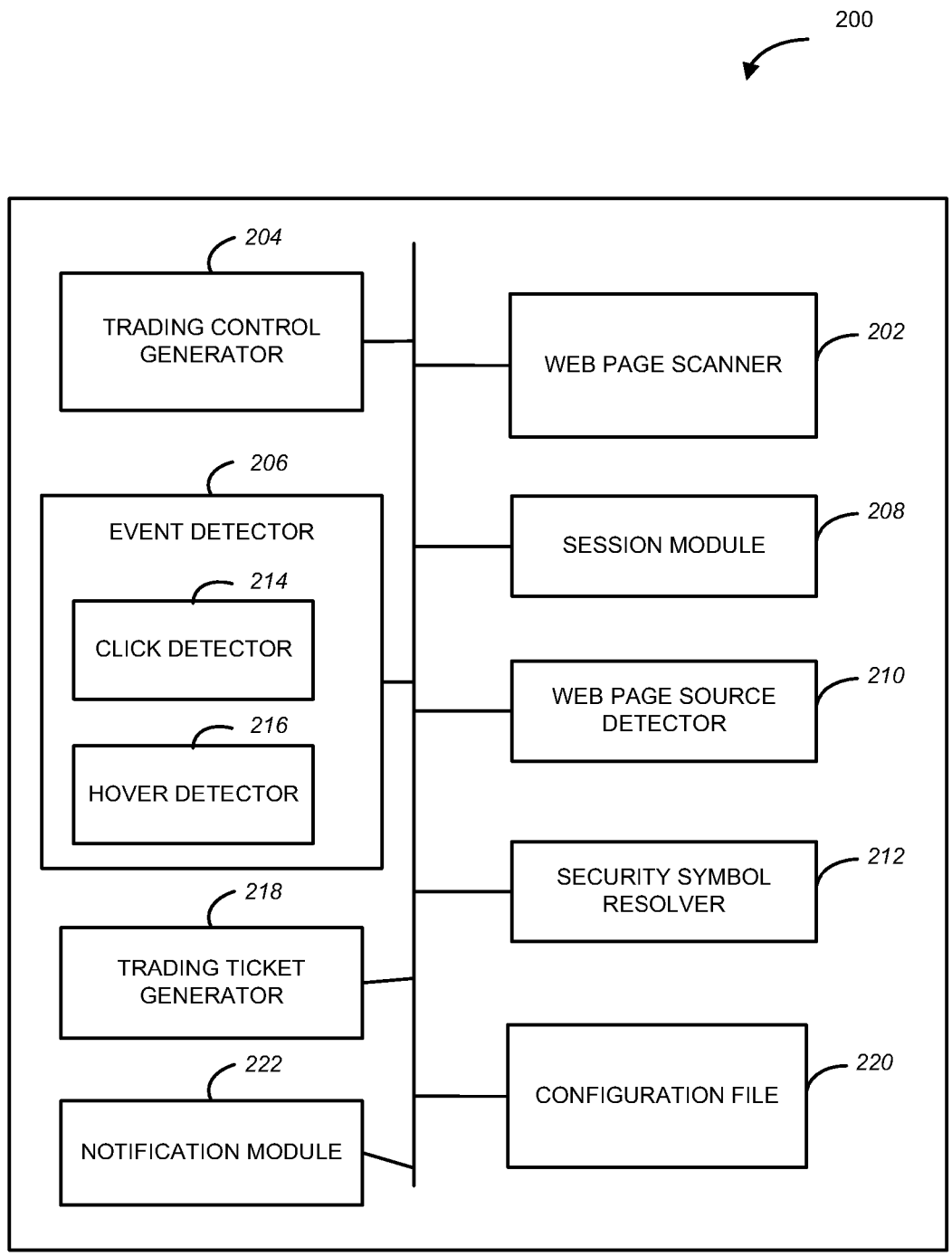
FIG. 2 is block diagram of a client-side trading module, in accordance with one example embodiment.

FIG. 2 is a block diagram of a system 200 to facilitate on-line trading, in accordance with one example embodiment. The system 200 may correspond to the plug-in 114 of FIG. 1. As shown in FIG. 2, the system 200, in one embodiment, comprises a web page scanner 202, a trading control generator 204, an event detector 206, and a trading ticket generator 218. The web page scanner 202 may be configured to scan a web page in order to detect security symbol information. The trading control generator 204 may be configured to present a trading control to associate visually the trading control with the detected security symbol information. The trading control may be activated in order to access a trading service. A trading control may be, for example, an actionable icon or some other control that could be activated by clicking or double clicking on the icon, by positioning a cursor over the icon, or by some other action or input such as, e.g., a market data feed (e.g., price change, news event). The event detector 206 may be configured to detect an event associated with the trading control (e.g., a click), so that the trading ticket generator 218 receives a request to launch a trading ticket associated with the security symbol information. In one embodiment, the event detector 206 may include a click detector 214 to detect click events and a hover detector 216 may be configured to detect hover events. As mentioned above, a trading ticket may be then utilized by a user for submitting a security order using the trading service.

The trading ticket generator 218 may also be configured to obtain, from the trading service, data suitable for pre-filling the trading ticket (e.g., the security symbol, relevant (financial) data associated with the security symbol, and relevant trading account information) and to pre-fill the trading ticket with the obtained data. As is described in further detail below, the system 200 can be used to facilitate on-line trading for a user through a certain trading service when the user has an account with the trading service and when a secure session has been established for the user.

The system 200 may also include a session module 208, a web page source detector 210, and a security symbol resolver 212. The session module 208 may be configured to determine whether a user associated with the event associated with the trading control has an account with the trading service and whether a secure session with the trading service has been established for the user. The web page source detector 210 may be configured to determine whether the web page currently loaded by the associated browser is a relevant financial or investing web page, which may be achieved by sending a match request to the trading service that may have access to a library of relevant financial and investing websites. The security symbol resolver 212 may be configured to communicate, to the trading service, a request to resolve a security symbol information (e.g., to provide a security symbol that corresponds to the security symbol information, such as the name of a company, or to confirm that the security symbol detected on a web page is a valid security symbol). The security symbol resolver 212 may also be configured to receive a resolved security symbol from the trading service. In some embodiments, the web page scanner 202 utilizes a configuration file 220 for scanning web pages and determining security symbols based on semantic patterns provided in the configuration file 220 so that the security symbol resolver 212 may not be necessary.

Also shown in FIG. 2 is a notification module 222. The notification module 222 may be configured to receive, from the trading service 142 of FIG. 1, messages associated with the disposition of respective submitted orders and generate notifications for the user, e.g., in the form of a pop-up window, status bar extension, sound, or otherwise. For example, the trading service 142 may report to the system 200 that the submitted order was accepted, rejected, executed, or cancelled. In response, the notification module 222 may generate a pop-up window, status bar extension, sound, or otherwise, to present the received message from the trading service 142 to the user.

It will be noted, that while FIG. 2 shows particular modules as part of another component (e.g., the click detector 214 and the hover detector 216 being part of the event detector 206), other embodiments may be provided where some modules of the system 200 shown as separate components are implemented as a single module. Conversely, embodiments may be provided where a component that is shown in FIG. 2 as a single module may be implemented as two or more separate components. Various operations performed by a system to facilitate on-line trading may be discussed with reference to FIG. 3.

Figure 3:
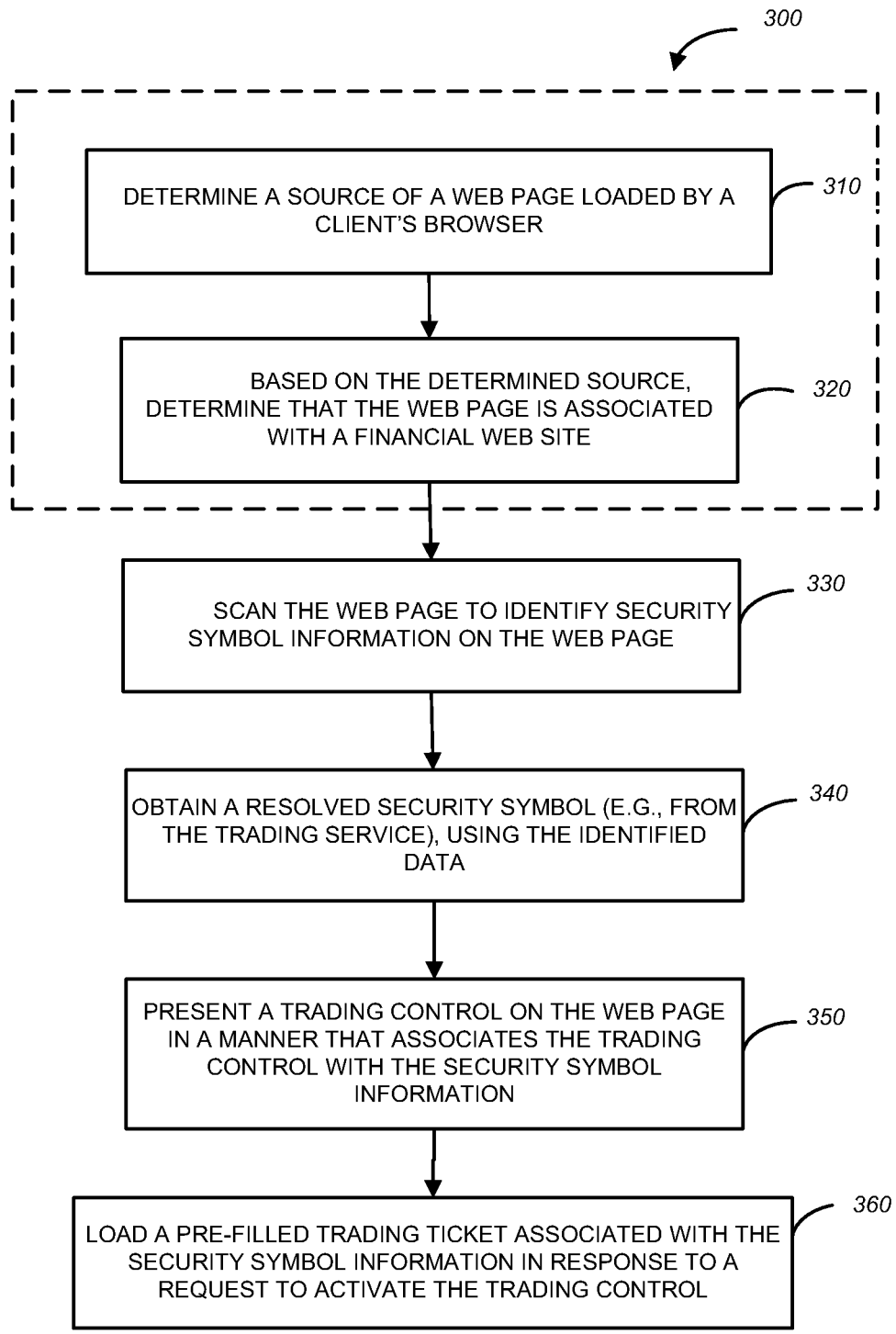
FIG. 3 is a flow chart of a method to provide access to a trading service from a third party web page utilizing a client-side trading module, in accordance with an example embodiment.

FIG. 3 is a flow chart of a method 300 to provide access to a trading service from a third party web page, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the trading plug-in 114 or a trading module 124 shown in FIG. 1.

As shown in FIG. 3, the method 300 commences at operations 310 and 320, where the web page source detector 210 of FIG. 2 determines a source of a web page loaded by a client's browser and, based on the determined source, identifies the web page as a relevant web page (e.g., a web page associated with a financial or investing website). The web page source detector 210 may obtain information regarding a source of a web page from a trading service running on a server system. As mentioned above, the operations for evaluating a web page to determine whether it is associated with a financial or investing website may be optional, and, in some embodiments, any web page loaded by the browser associated with a trading plug-in or a trading module on the client system is processed to determine information that may potentially be resolved into a security symbol. The web page scanner 202 of FIG. 2 scans the web page, at operation 330, to identify security symbol information. At operation 340, the security symbol resolver 212 may submit a request including the identified security symbol information to the trading service to obtain a resolved security symbol (e.g., a confirmation that the identified data associated with a security symbol is associated with a valid security ticker symbol). In some embodiments, the initial scanning performed at operation 330 may be based on semantic patterns provided in the configuration file 220 of FIG. 2 and thus the resolving operation 340 is not performed.

At operation 350, the trading control generator 204 of FIG. 2 generates a trading control to be presented on the web page in a manner that associates the trading control with the security symbol information. In one embodiment, security symbol information is a stock symbol or the name of a company. Thus, a user that has an account with or has an interest in using the trading service provided at the server system 140 of FIG. 1 is permitted to access the trading service from any third party web page, by activating the trading control presented at operation 350. At operation 360, the trading ticket generator 218 of FIG. 2 loads a trading ticket associated with the security symbol information in response to a request to activate the trading control. The trading ticket may be pre-filled with the data associated with the security symbol information. The trading control may be activated by, e.g., clicking on the control, by detecting that a pointer is hovering over the trading control (detecting a hover event), etc. The pre-filled trading ticket may be utilized by a user to submit a security order, provided the user has an account with the trading service and a secure session with the trading service has been established. Example operations that are performed in the process of determining whether a user has an account with the trading system and whether a secure session with the trading service has been established for the user may be discussed with reference to FIG. 4.

Figure 4:
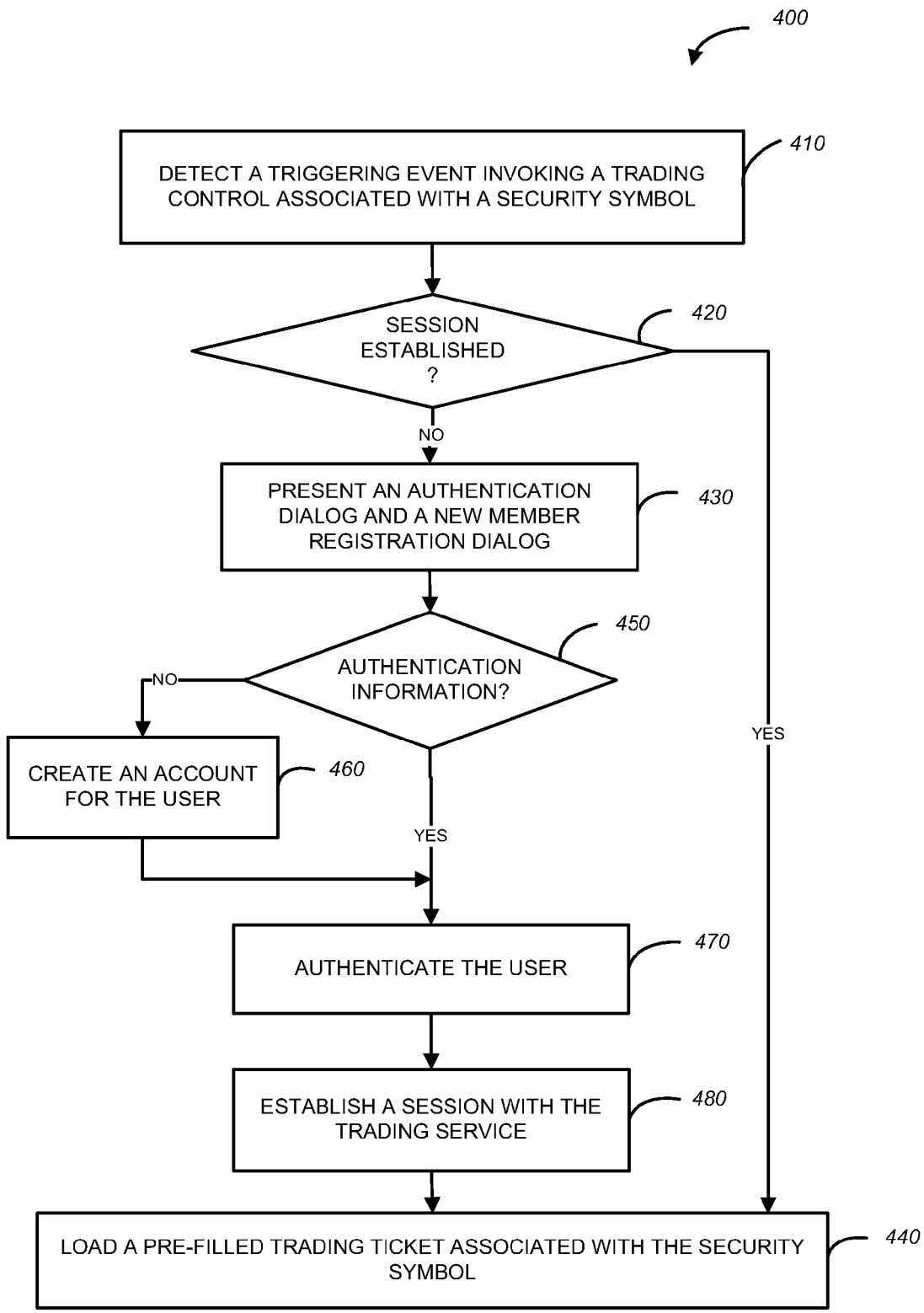
FIG. 4 is a flow chart of a method to facilitate loading of a pre-filled trading ticket.

FIG. 4 is a flow chart of a method 400 to facilitate loading of a pre-filled trading ticket, according to one example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the trading plug-in 114 or a trading module 124 shown in FIG. 1.

As shown in FIG. 4, the method 400 commences at operations 410, where the event detector 206 of FIG. 2 detects a triggering event for the purpose of invoking a trading control associated with a security symbol. The session module 208 of FIG. 2 determines, at operation 420, whether a secure session with the trading service was established for the user. If the session has been established for the user, the trading ticket generator 218 of FIG. 2 loads a pre-filled trading ticket associated with the security symbol, at operation 440. As mentioned above, the trading ticket may be utilized for placing an order with the trading service.

If it is determined, at operation 420, that a session with the trading service has not been established for the user, the session module 208 presents a user with an authentication/registration interface that permits a user to either provide authentication information in order to establish a session with the trading service or, if the user does not yet have an account with the trading service, to create an account with the trading service, at operation 430. If it is determined, at operation 450, that the user submitted authentication information, the user is authenticated at operation 470, which may include sending an authentication request to the trading service and receiving a response from the trading service. If the authentication information was not provided and a request for a new user registration is detected, an account with the trading service is created for the user at operation 460.

When the user is authenticated at operation 470, the session module 208 invokes a secure session with the trading service for the user at operation 480, and the trading ticket generator 218 loads a pre-filled trading ticket. In some embodiments, data to be used for pre-filling a trading ticket may be obtained by the trading ticket generator 218 from the trading service (e.g., from the trading service module 142 residing at the server system 140 of FIG. 1. Some example operations performed at the trading service module 142 may be described with reference to FIG. 5 and FIG. 6.

Figure 5:
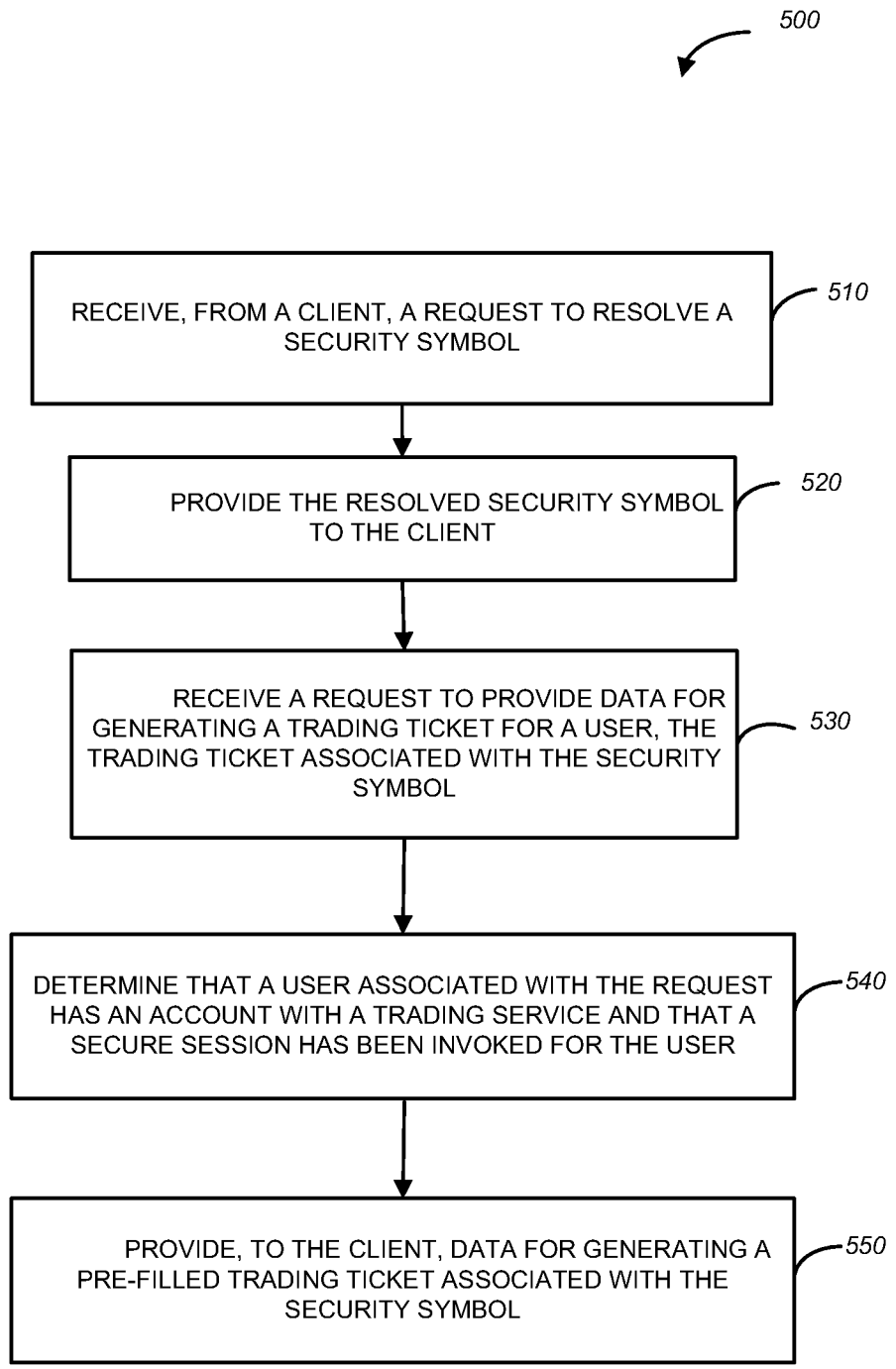
FIG. 5 illustrates example operations performed at a server system hosting a trading service module to provide data to a client-side trading module, according to one example embodiment.

FIG. 5 is a flow chart of a method 500 to provide data to a client-side trading module, according to one example embodiment. The method 500 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the trading service module 142 shown in FIG. 1.

As shown in FIG. 5, the method 500 commences at operation 510, where a request to resolve a security symbol is received from a trading module (e.g., a trading plug-in) installed on a client computer system. A security symbol may be resolved by matching security symbol information received with the request with a record in the security symbol library 160 of FIG. 1. The resolved security symbol is provided to the client at operation 520. In response to a request to provide data for generating a trading ticket for a user (operation 530), the trading service determines whether the user has an account with the trading service and that a secure session with the trading service has been established for the user (operation 540). At operation 550, the trading service may provide to the client data for pre-filling the trading ticket for the user.

Figure 6:
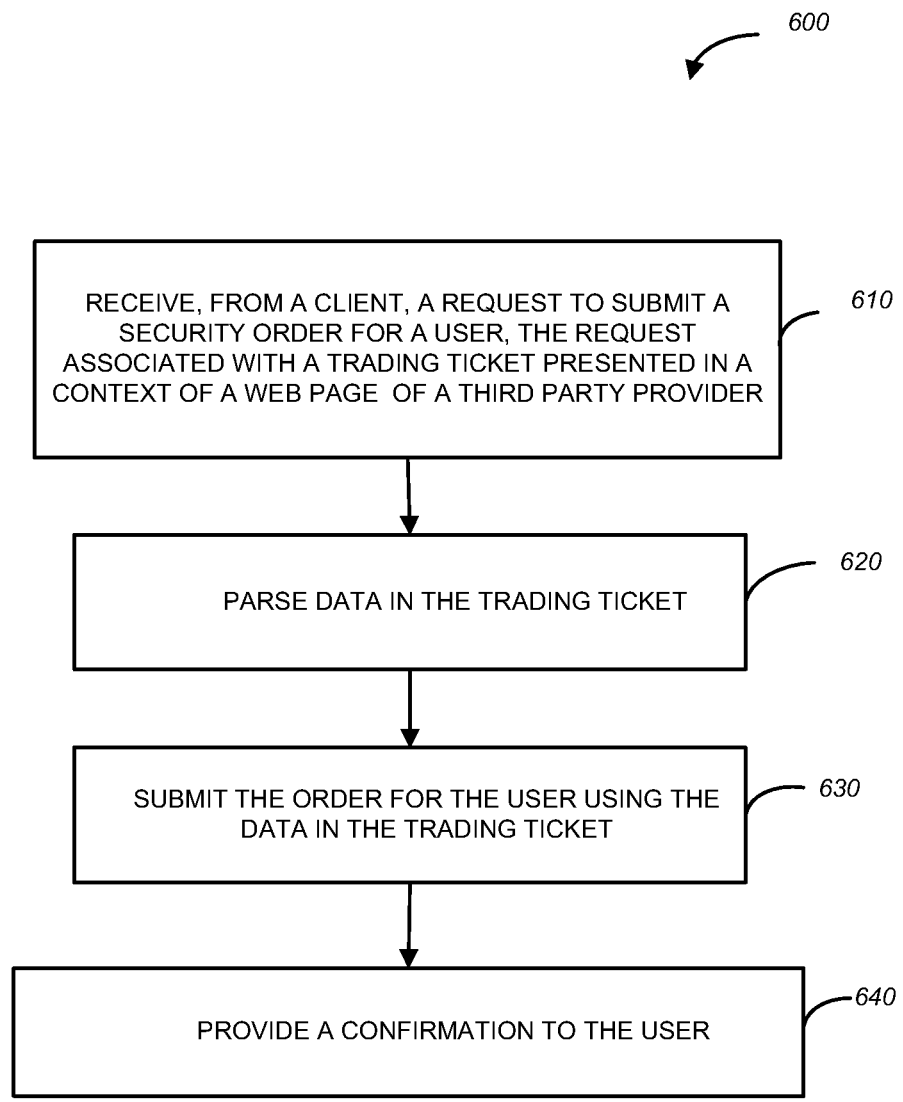
FIG. 6 illustrates example operations performed at a server system hosting a trading service module to submit a security order for a user, according to one example embodiment.

As mentioned above, the method and system described herein maybe utilized advantageously to permit a user to access the trading platform and submit orders from any third party web page. FIG. 6 illustrates a method 600 for submitting a security order for a user, where a trade process is initiated from a third party web page. As shown in FIG. 6, the trading service module 142 of FIG. 1 receives, from a client system, a request to submit a security order for a user, at operation 610. The request, in one example embodiment, is associated with a trading ticket presented in a context of a web page of a third party provider. At operation 620, the trading service module parses the data received from the trading ticket to determine and validate the data needed for submitting the order. The determined data is used by the trading service module 142 to submit the order for the user at operation 630. At operation 640, the trading service module 142 provides a confirmation of the submitted order to the user.

Figure 7:
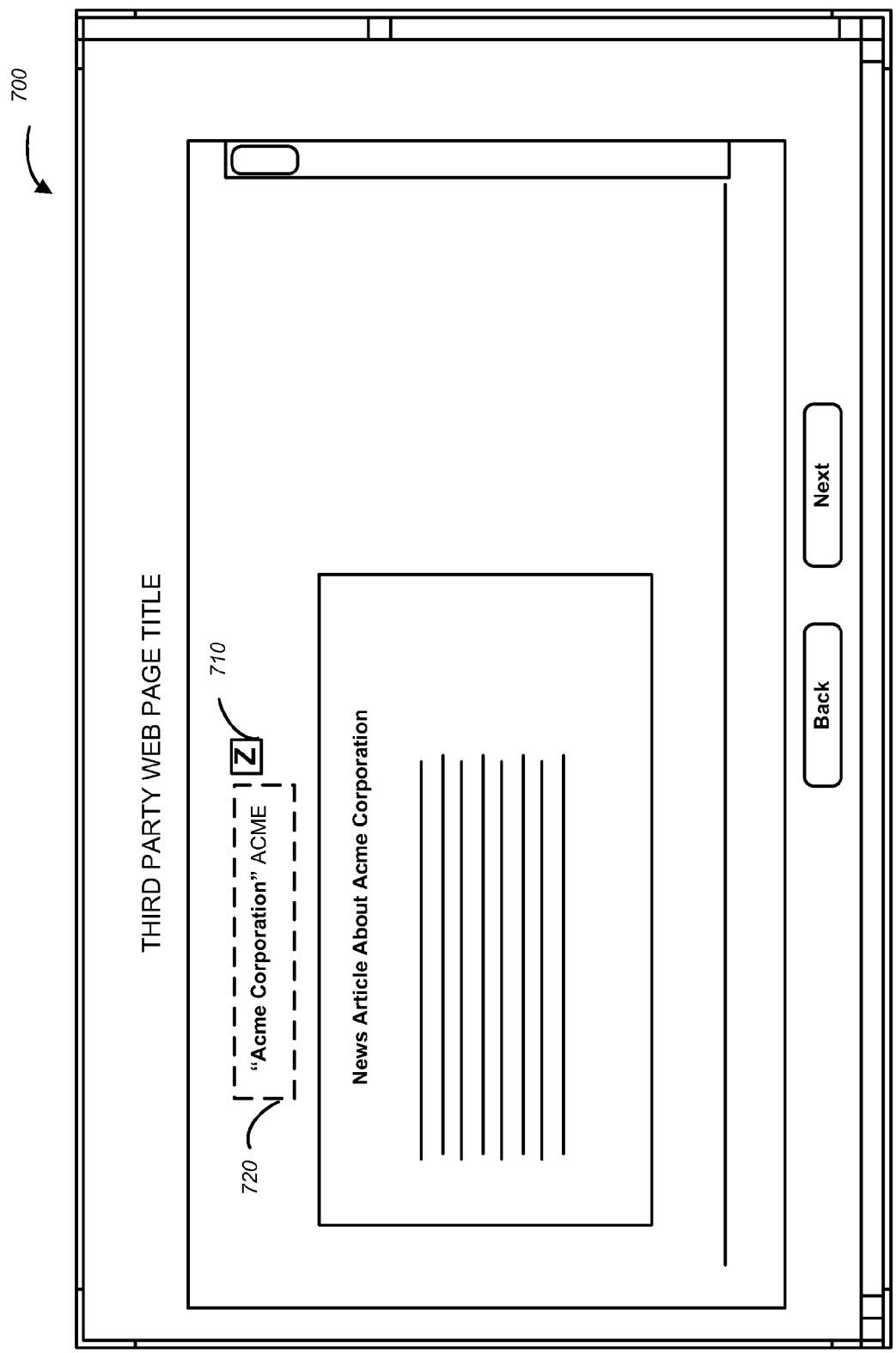
FIG. 7 illustrates a user interface including a trading control to provide access to the trading service from a web page provided by a third party, according to one example embodiment.
Figure 8:
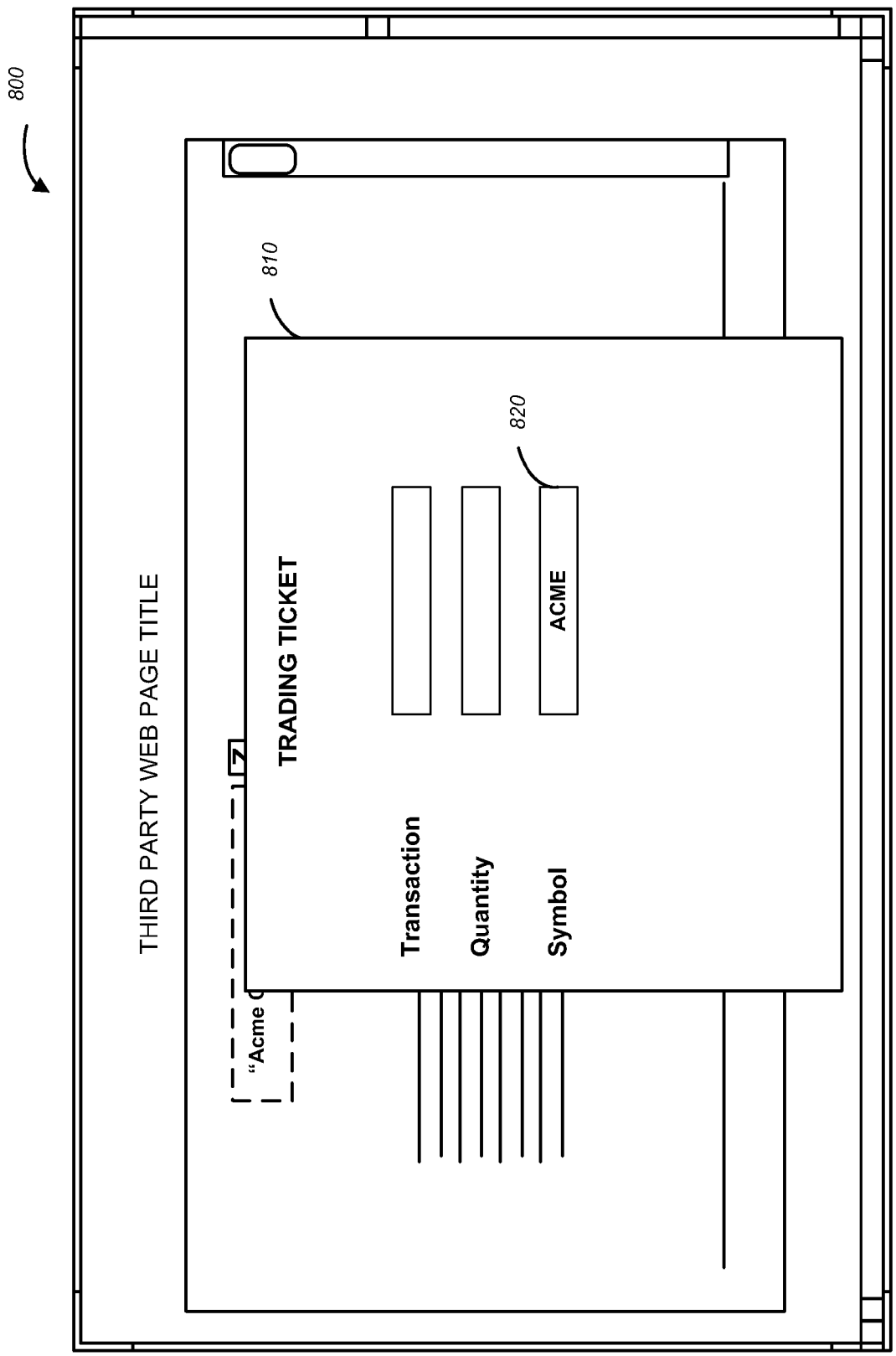
FIG. 8 illustrates a user interface including an overlaid trading ticket configured to provide access to the trading service, according to one example embodiment.

FIG. 7 illustrates a user interface 700 including a trading control 710. As shown in FIG. 7, the trading control 710 is displayed such that its position on the third party web page indicates that it is associated with a security or company identified in area 720. FIG. 8 illustrates a user interface 800 showing a trading ticket 810 overlaid over the third party web page area. The security symbol "ACME" shown in field 820 is pre-filled in the trading ticket 810 using the techniques described above. In addition, the trading ticket 810 can be pre-filled with relevant (financial) data associated with the security symbol, and relevant trading account information (not shown in 810).

Figure 9:
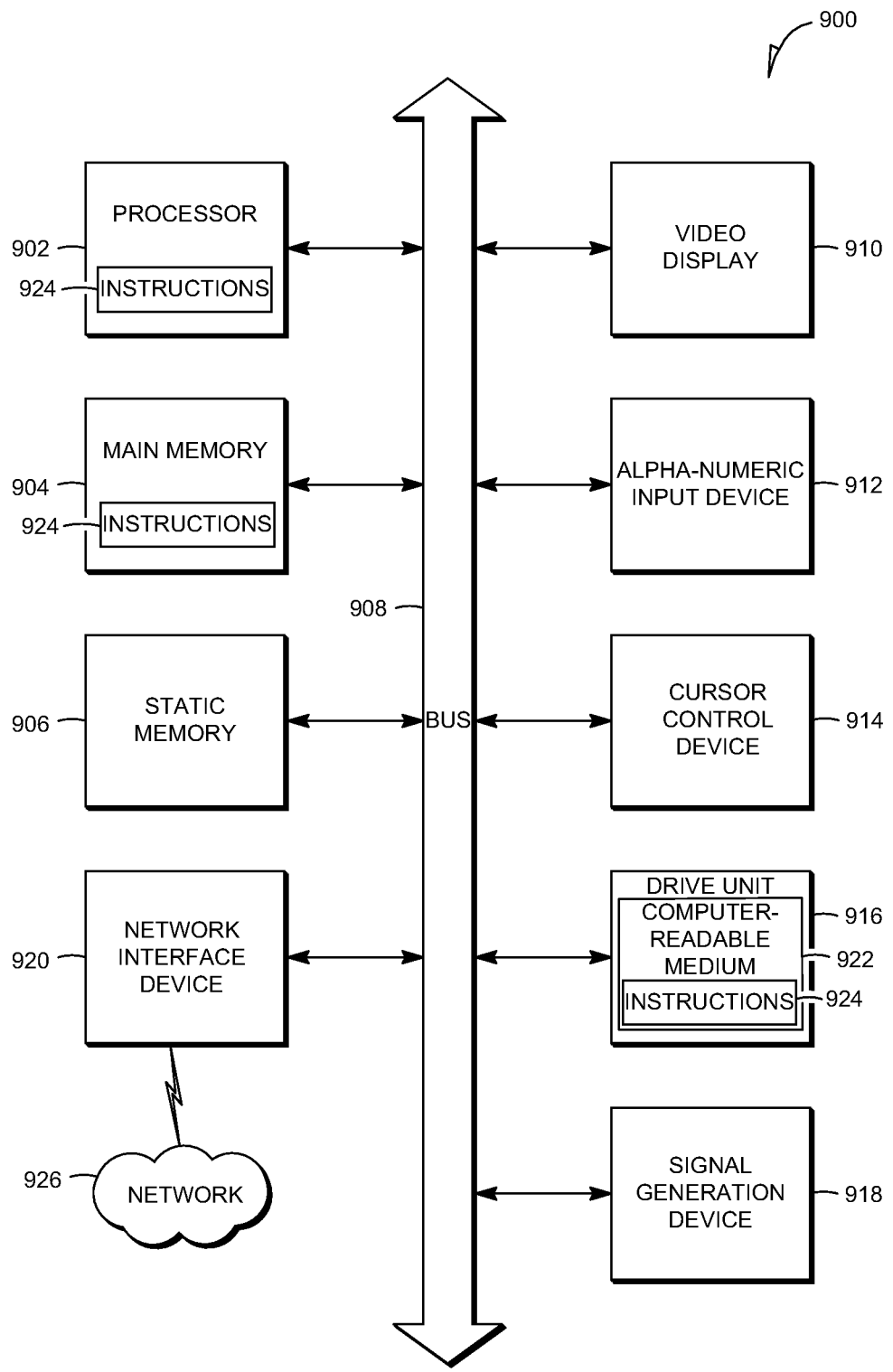
FIG. 9 is a diagrammatic representation of an example machine in the form of a computer system within which a set of instructions, for causing the machine to perform any one or more of the methodologies discussed herein, may be executed.

FIG. 9 shows a diagrammatic representation of a machine in the example form of a computer system 900 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alpha-numeric input device 912 (e.g., a keyboard), a user interface (UT) navigation device 914 (e.g., a cursor control device), a disk drive unit 916, a signal generation device 918 (e.g., a speaker) and a network interface device 920.

The disk drive unit 916 includes a machine-readable medium 922 on which is stored one or more sets of instructions and data structures (e.g., software 924) embodying or utilized by any one or more of the methodologies or functions described herein. The software 924 may also reside, completely or at least partially, within the main memory 904 and/or within the processor 902 during execution thereof by the computer system 900, with the main memory 904 and the processor 902 also constituting machine-readable media.

The software 924 may further be transmitted or received over a network 926 via the network interface device 920 utilizing any one of a number of well-known transfer protocols (e.g., Hyper Text Transfer Protocol (HTTP)).

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Thus, a method and system to facilitate on-line trading has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A computer-implemented system to facilitate on-line trading, the system comprising:
a web page scanner to scan a web page to detect security symbol information;
a trading control generator to present a trading control to associate visually the trading control with the detected security symbol information, the trading control to access a trading service;
an event detector to detect an event associated with the trading control;
wherein responsive to the event associated with the trading control:
determining that a user associated with the event has an account with the trading service; and
determining that a secure session with the trading service has been established for the user; and a trading ticket generator to launch a trading ticket associated with the security symbol information, the trading ticket suitable for submitting an order using the trading service.

2. The system of claim 1, wherein the web page is associated with a third party provider distinct from a provider of the trading service.

3. The system of claim 1, comprising a session module to:
determine that a user associated with the event associated with the trading control has an account with the trading service, and
determine that a secure session with the trading service has been established for the user.

4. The system of claim 1, comprising a web page source detector to determine, using the trading service, that the web page is a relevant financial or investing web page.

5. The system of claim 1, comprising a security symbol resolver to:
communicate, to the trading service, a request including the security symbol information; and
receive a resolved security symbol from the trading service.

6. The system of claim 1, wherein the security symbol information is a name of a company.

7. The system of claim 1, comprising a session module to:
responsive to the event associated with the trading control, determine that a secure session with the trading service has not been established for a user associated with the event associated with the trading control; and
present an authentication dialog for the user.

8. The system of claim 1, wherein the trading ticket generator is to:
obtain, from the trading service, data suitable for pre-filling the trading ticket; and
pre-fill the trading ticket with the obtained data.

9. The system of claim 1, wherein the event associated with the trading control comprises a click event.

10. The system of claim 1, wherein the event associated with the trading control comprises a hover event.

11. A computer-implemented method to facilitate on-line trading, the method comprising:
using one or more processors to perform operations of:
scanning a web page to detect security symbol information;
presenting a trading control to associate visually the trading control with the detected security symbol information, the trading control to access a trading service;
detecting an event associated with the trading control;
wherein responsive to the event associated with the trading control:
determining that a user associated with the event has an account with the trading service; and
determining that a secure session with the trading service has been established or the user; and
launching a trading ticket associated with the security symbol information, the trading ticket suitable for submitting an order using the trading service.

12. The method of claim 11, wherein the web page is associated with a third party provider distinct from a provider of the trading service.

13. The method of claim 11, comprising:
determining, using the trading service, that the web page is a relevant financial or investing web page.

14. The method of claim 11, comprising:
communicating, to the trading service, a request including the security symbol information; and
receiving a resolved security symbol from the trading service.

15. The method of claim 11, wherein the security symbol information is a name of a company.

16. The method of claim 11, comprising:
responsive to the event associated with the trading control
determining that a secure session with the trading service has not been established for the user; and
presenting an authentication dialog.

17. The method of claim 11, wherein the launching of the trading ticket associated with the security symbol information comprises:
obtaining, from the trading service, data suitable for pre-filling the trading ticket; and
pre-filling the trading ticket with the obtained data.

18. The method of claim 11, wherein the event associated with the trading control comprises a click event.

19. A machine-readable non-transitory storage medium to facilitate on-line trading, wherein the machine-readable non-transitory storage medium having instruction data to cause a machine to:
scan a web page to detect security symbol information;
present a trading control to associate visually the trading control with the detected security symbol information, the trading control to access a trading service;
detect an event associated with the trading control;
wherein responsive to the event associated with the trading control:
determining that a user associated with the event has an account with the trading service; and
determining that a secure session with the trading service has been established for the user; and
launch a trading ticket associated with the security symbol information, the trading ticket suitable for submitting an order using the trading service.

* * * * *

UNITED STATES PATENT AND TRADEMARK OFFICE
CERTIFICATE OF CORRECTION

| | | |
|---|---|---|
| PATENT NO. | : 8,463,692 B2 | Page 1 of 1 |
| APPLICATION NO. | : 12/491762 | |
| DATED | : June 11, 2013 | |
| INVENTOR(S) | : de Boer et al. | |

It is certified that error appears in the above-identified patent and that said Letters Patent is hereby corrected as shown below:

On the Title page, in column 2, Item (56) under "Other Publications", line 4, delete "5 , 2007." and insert --5, 2007.--, therefor On Title page 2, in column 2, Item (56) under "Other Publications", line 2, delete "Newswire ," and insert --Newswire,--, therefor On Title page 2, in column 2, Item (56) under "Other Publications", line 15, delete "Mailed" and insert --mailed--, therefor On Title page 2, in column 2, Item (56) under "Other Publications", line 18, delete "Mailed" and insert --mailed--, therefor In the Claims In column 9, line 20, in Claim 1, after "and", insert --¶--, therefor In column 10, line 13, in Claim 11, delete "or" and insert --for--, therefor Signed and Sealed this
Twenty-sixth Day of November, 2013

Margaret A. Focarino
*Commissioner for Patents of the United States Patent and Trademark Office*